United States Patent
Yamashita

(10) Patent No.: US 8,570,371 B2
(45) Date of Patent: Oct. 29, 2013

(54) OBJECT TRACKING APPARATUS, OBJECT TRACKING METHOD, AND CONTROL PROGRAM

(75) Inventor: Takayoshi Yamashita, Kyoto (JP)

(73) Assignee: OMRON Corporation, Kyoto (JP)

( * ) Notice: Subject to any disclaimer, the term of this patent is extended or adjusted under 35 U.S.C. 154(b) by 400 days.

(21) Appl. No.: 13/032,088

(22) Filed: Feb. 22, 2011

(65) Prior Publication Data

US 2011/0221890 A1  Sep. 15, 2011

(30) Foreign Application Priority Data

Mar. 15, 2010  (JP) ................................ 2010-058548

(51) Int. Cl.
*H04N 7/18* (2006.01)

(52) U.S. Cl.
USPC .......................................................... 348/135

(58) Field of Classification Search
USPC .......................................................... 348/135
See application file for complete search history.

(56) References Cited

U.S. PATENT DOCUMENTS

| | | | |
|---|---|---|---|
| 6,590,999 B1 | 7/2003 | Comaniciu et al. | |
| 8,027,523 B2* | 9/2011 | Sun et al. | 382/118 |
| 2005/0232466 A1* | 10/2005 | Kampchen et al. | 382/103 |
| 2006/0198554 A1* | 9/2006 | Porter et al. | 382/159 |
| 2008/0186386 A1* | 8/2008 | Okada et al. | 348/208.4 |
| 2011/0019027 A1* | 1/2011 | Fujita et al. | 348/222.1 |

FOREIGN PATENT DOCUMENTS

| | | | |
|---|---|---|---|
| KR | 2009-0030142 A | 3/2009 | |
| WO | 2006/097681 A1 | 9/2006 | |

OTHER PUBLICATIONS

Zaheer Shaik et al.: "A Robust Method for Multiple Face Tracking Using Kalman Filter", Applied Imagery Pattern Recognition Workshop, 2007. AIPR 2007. 36th IEEE, IEEE, Piscataway, NJ, USA, Oct. 10, 2007, pp. 125-130, XP031239232.
Valtteri Takala et al.: "Multi-Object Tracking Using Color, Texture and Motion", CVPR '07. IEEE Conference on Computer Vision and Pattern Recognition; Jun. 18-23, 2007; Minneapolis, MN, USA, IEEE, Piscataway, NJ, USA, Jun. 1, 2007, pp. 1-7, XP031114736.
European Search Report issued in European Application No. 10 19 6697 mailed on Jul. 6, 2011, 2 pages.
English abstract of Korean Publication No. 2009-0030142A published on Mar. 24, 2009, 1 page.
H. Grabner, et. al., Online Boosting and Vision, IEEE. Conf. on Computer Vision and Pattern Recognition, pp. 260-267, 2006.

* cited by examiner

*Primary Examiner* — David Czekaj
*Assistant Examiner* — Tracy Li
(74) *Attorney, Agent, or Firm* — Osha Liang LLP

(57) ABSTRACT

An object tracking apparatus that tracks an object in a time-series image including a plurality of frames has a positional relationship determining unit that determines a positional relationship between the object and an analog having a feature similar to that of the object in an earlier frame of a current frame, an object position specifying unit that specifies a position of the object in the current frame, and an analog position specifying unit that specifies a position of the analog in the current frame when the analog exists in a surrounding region that is of a predetermined region around the object. The object position specifying unit predicts the position of the object in the current frame to specify the position of the object based on the position of the object and a motional state of the object in an earlier frame when the positional relationship is in a first state.

19 Claims, 9 Drawing Sheets

OBJECT TRACKING APPARATUS, OBJECT TRACKING METHOD, AND CONTROL PROGRAM

BACKGROUND OF THE INVENTION

1. Technical Field

The present invention relates to a technology of tracking an object in a moving image.

2. Related Art

Conventionally, there is utilized a technology of tracking motion of a body such as a person or a substance in a moving image. For example, in one of the motion tracking technologies, when the object is once focused on in shooting a moving image with a digital camera, a digital video camera, or a mobile phone, the object is tracked while continuously focused on.

The body tracking includes initialization processing of deciding on the tracked body from the image of a certain frame and searching processing of searching a body (region) similar to the tracked object decided on in the initialization processing from the images of the next frame or later. In the initialization processing, a partial region of the image can be designated as the tracked object by designating a region in the image with a touch panel or using a well-known face detection or person detection. A template indicating a feature of the designated tracked object is produced in the initialization processing. The tracked object in the image of the next frame is searched by using a degree of similarity to the template in the searching processing. The template is updated according to the tracked object in the image of the next frame in the searching processing.

Examples of the template producing method include a method (for example, see U.S. Pat. No. 6,590,999) for obtaining a color distribution or an edge distribution of the tracked object from a region of the tracked object of the image and a method (for example, see H. Grabner, et. al., "Online Boosting and Vision", IEEE. Conf. on Computer Vision and Pattern Recognition, PP. 260-267, 2006) for obtaining effective information discriminating between the tracked object and the surrounding region from the region of the tracked object of the image and the surrounding region of the tracked object.

In a technology disclosed in U.S. Pat. No. 6,590,999, the color distribution of the tracked object in the past image is stored as the template, and the region similar to the template is searched in the current image by using a gradient method.

In a technology disclosed in H. Grabner, et. al., "Online Boosting and Vision", IEEE. Conf. on Computer Vision and Pattern Recognition, PP. 260-267, 2006, in order to discriminate between the tracked object and the surrounding region, information (for example, information on a background color) indicating a difference between the tracked object and the surrounding region is obtained from the image to perform learning as a discriminator of the tracked object, and the tracked object is tracked.

However, in the conventional configuration, when the body (analog) similar to the tracked object exists near the tracked object, unfortunately sometimes the analog is mistakenly tracked instead of the tracked object.

In the technology disclosed in U.S. Pat. No. 6,590,999, the template includes the information on the color or edge distribution obtained from the tracked object, and the analog is detected by the degree of similarity to the template. Therefore, when the analog exists near the tracked object, sometimes the analog is mistakenly tracked.

In the technology disclosed in H. Grabner, et. al., "Online Boosting and Vision", IEEE. Conf. on Computer Vision and Pattern Recognition, PP. 260-267, 2006, when the analog that is extremely similar to the tracked object exists near the tracked object, because the effective information for discriminating between the tracked object and the surrounding region (including the analog) cannot be extracted, the tracked object cannot be tracked.

SUMMARY

One or more embodiments of the present invention provides an object tracking apparatus and an object tracking method, which can precisely track the tracked object even if the analog of the tracked object exists around the tracked object.

In accordance with one aspect of the present invention, there is provided an object tracking apparatus that tracks an object in a time-series image including a plurality of frames, the object tracking apparatus including: a positional relationship determining unit that determines a positional relationship between the object and an analog having a feature similar to that of the object in an earlier frame of a current frame; an object position specifying unit that specifies a position of the object in the current frame; and an analog position specifying unit that specifies a position of the analog in the current frame when the analog exists in a surrounding region that is of a predetermined region around the object, wherein the object position specifying unit predicts the position of the object in the current frame to specify the position of the object based on the position of the object and a motional state of the object in an earlier frame when the positional relationship is in a first state, and the object position specifying unit searches the object from an image of the current frame to specify the position of the object when the positional relationship is not in the first state.

In accordance with another aspect of the present invention, there is provided an object tracking method for tracking an object in a time-series image including a plurality of frames, the object tracking method including the steps of: determining a positional relationship between the object and an analog having a feature similar to that of the object in an earlier frame of a current frame; specifying a position of the object in the current frame; specifying a position of the analog in the current frame when the analog exists in a surrounding region that is of a predetermined region around the object; wherein, in the object position specifying step, the position of the object in the current frame is predicted to specify the position of the object based on the position of the object and a motional state of the object in an earlier frame when the positional relationship is in a first state, and the object from an image of the current frame is searched to specify the position of the object when the positional relationship is not in the first state.

According to the configuration, the processing of the object position specifying unit is switched according to the positional relationship between the object and the analog. Therefore, when the object can hardly precisely be tracked due to the positional relationship between the object and the analog, the position of the object in the current frame can be predicted to specify the position of the object based on the position of the object and the motional state of the object. Therefore, even if the analog exists around the object, the transfer of the tracking can be prevented to track precisely the object.

According to one or more embodiments of the present invention, the positional relationship determining unit determines that the positional relationship is in the first state when the analog exists within a first range near the object.

According to the configuration, when the analog exists near the object, the object position specifying unit predicts the position of the object in the current frame based on the position of the object and the motional state of the object. Therefore, even if the transfer of the tracking is easily generated in performing the tracking processing because the analog exists near the object, the position of the object is predicted from the motional state of the object, so that the transfer of the tracking can be prevented to track precisely the object.

According to one or more embodiments of the present invention, the analog position specifying unit searches the analog from the image of the current frame to specify the position of the analog.

According to one or more embodiments of the present invention, the object tracking apparatus further includes an analog motional state specifying unit, wherein the positional relationship determining unit determines that the positional relationship is in a second state when the analog exists within a second range outside the first range, the analog motional state specifying unit specifies a motional state of the analog when the positional relationship is in the second state, the analog position specifying unit predicts the position of the analog in the current frame to specify the position of the analog based on the position of the analog and the motional state of the analog in an earlier frame when the positional relationship is in the first state, and the analog position specifying unit searches the analog from the image of the current frame to specify the position of the analog when the positional relationship is in the second state.

According to the configuration, the analog motional state specifying unit specifies the motional state of the analog in the second state in which the transfer of the tracking is hardly generated because the object and the analog are separated to some extent, and the analog position specifying unit predicts the position of the analog in the current frame based on the position of the analog and the motional state of the analog in the first state in which the transfer of the tracking is easily generated because the object and the analog comes close to each other. Therefore, even if the analog cannot precisely be searched because the analog exists near the object, the position of the analog can be predicted from the motional state of the analog.

According to one or more embodiments of the present invention, the positional relationship determining unit determines that the positional relationship is in a third state when the analog exists in neither the first range nor the second range, and the analog position specifying unit searches the analog from the image of the current frame to specify the position of the analog when the positional relationship is in the third state.

According to one or more embodiments of the present invention, the object tracking apparatus further includes an object motional state specifying unit that specifies the motional state of the object.

According to the configuration, because the object motional state specifying unit specifies the motional state of the object, the object position specifying unit can predict the position of the object in the current frame based on the position of the object and the motional state of the object.

According to one or more embodiments of the present invention, the positional relationship determining unit determines the positional relationship according to a distance between the object and the analog.

According to the configuration, the processing of the object position specifying unit can be switched according to the distance between the object and the analog.

According to one or more embodiments of the present invention, the motional state indicates a speed.

According to the configuration, when the object can hardly precisely be tracked, the object position specifying unit can predict the position of the object in the current frame to specify the position of the object based on the position of the object and the object speed.

In accordance with still another aspect of the present invention, there is provided an object tracking apparatus that tracks an object in a time-series image including a plurality of frames, the object tracking apparatus including: an object position specifying unit that searches the object from an image of a current frame to specify a position of the object in the current frame; and an analog position specifying unit searches an analog having a feature similar to that of the object from the image of the current frame, and specifies a position of the analog in the current frame when the analog exists in a surrounding region that is of a predetermined region around the object.

In accordance with still yet another aspect of the present invention, there is provided an object tracking method for tracking an object in a time-series image including a plurality of frames, the object tracking method including the steps of: searching the object from an image of a current frame to specify a position of the object in the current frame; and searching an analog having a feature similar to that of the object from the image of the current frame, and specifying a position of the analog in the current frame when the analog exists in a surrounding region that is of a predetermined region around the object.

According to the configuration, the analog that is easily mistakenly recognized as the object is previously detected to specify the position thereof. Therefore, a determination whether the candidate of the object that is detected in a certain frame is the analog can be made by using the information on the position of the analog in the earlier frame. Therefore, the transfer of the tracking can be prevented to track precisely the object. For example, the object position specifying unit computes likelihood that the candidate is the object according to the distance of the candidate of the object in a certain frame from the analog of the previous frame (and distance from the object of the previous frame), and the object position specifying unit may determine whether the candidate is the object based on the likelihood.

According to one or more embodiments of the present invention, the object tracking apparatus further includes an object feature quantity producing unit that extracts characteristic information on the object from the image of the current frame, and produces a characteristic object feature quantity of the object by using the extracted characteristic information on the object, wherein the object position specifying unit searches the object from the image of the current frame to specify the position of the object by using the object feature quantity in an earlier frame, and the analog position specifying unit searches the analog from the image of the current frame to specify the position of the analog in the current frame by using the object feature quantity.

According to the configuration, the analog is searched by using the object feature quantity identical to that of the object searching. Therefore, only the analog that is easily mistakenly recognized as the object because of the same feature as the object can be searched more precisely. The analog can be searched by using the already-produced object feature quantity, so that a processing time necessary to search the analog can be shortened.

The object tracking apparatus may partially be implemented by a computer. In such cases, a control program that causes the computer to implement the object tracking apparatus by operating the computer as each of the units and a computer-readable recording medium in which the control programs are recorded are also included in one or more embodiments of the invention.

As described above, according to one or more embodiments of the invention, the analog that is easily mistakenly recognized as the object is previously detected, and the position of the analog is specified. Therefore, the determination whether the candidate of the object detected in a certain frame is the analog can be made by using the information on the position of the analog in an earlier frame. Accordingly, the transfer of the tracking can be prevented to track precisely the object.

According to one or more embodiments of the invention, the processing of the object position specifying unit is switched according to the positional relationship between the object and the analog. When the object is hardly precisely tracked due to the positional relationship between the object and the analog, the position of the object can be specified by predicting the position of the object in the current frame based on the position of the object and the motional state of the object. Therefore, even if the analog exists around the object, the transfer of the tracking can be prevented to track precisely the object.

BRIEF DESCRIPTION OF THE DRAWINGS

FIG. 8 is a view illustrating an example of a positional relationship between an object and an analog.

DETAILED DESCRIPTION

Hereinafter, embodiments of the present invention will be described with reference to the drawings. A body tracking system, which is mounted on a digital video camera and tracks an object in an imaged moving image to focus continuously on the object, will be described below. However, the invention is not limited thereto. The body tracking system will be described with reference to FIGS. 1 to 9. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<Configuration of Body Tracking System>

Figure 1:
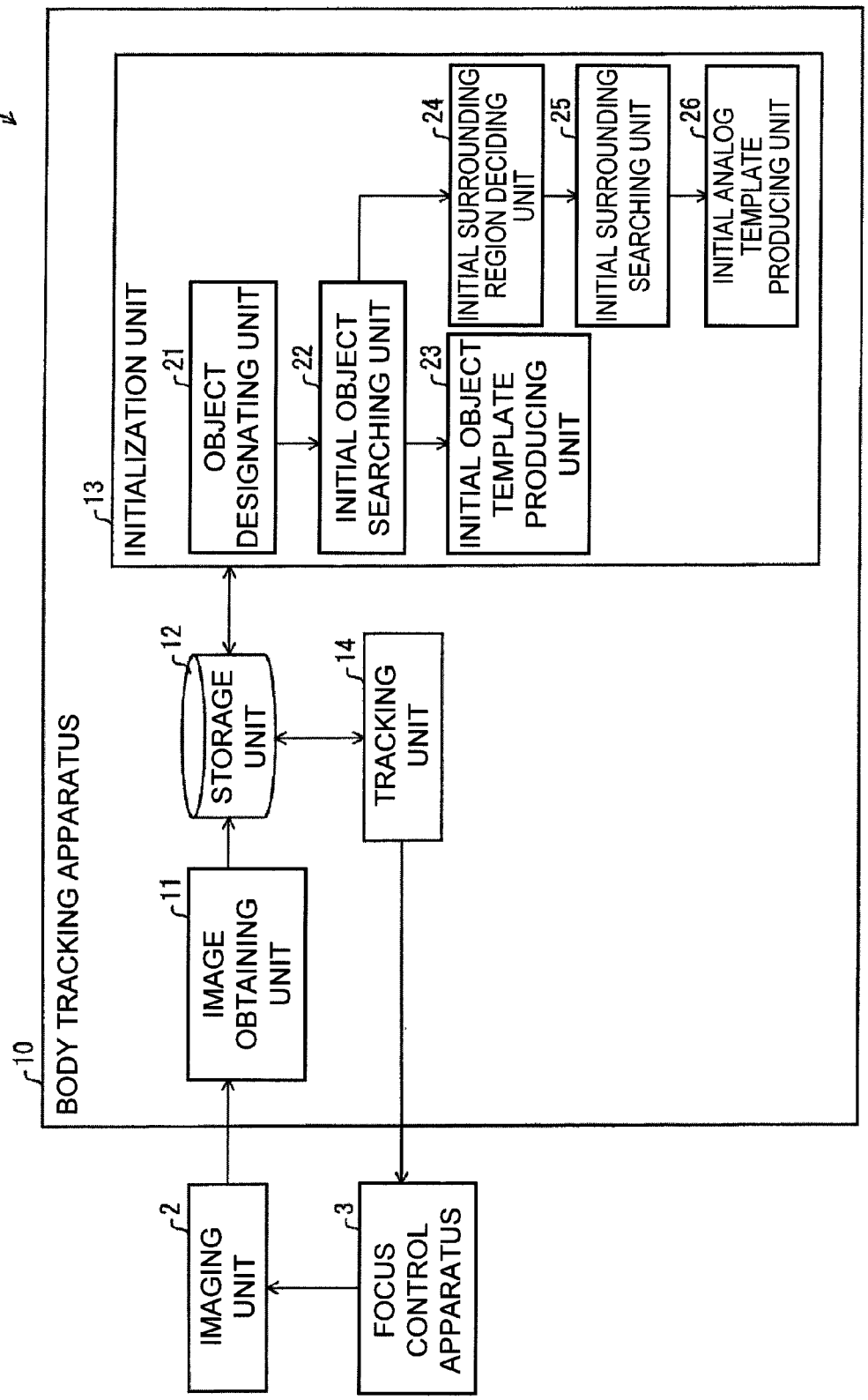
FIG. 1 is a block diagram illustrating a schematic configuration of a body tracking system according to one or more embodiments of the invention.

FIG. 1 is a block diagram illustrating a schematic configuration of a body tracking system 1 according to one or more embodiments of the invention. The body tracking system 1 includes an imaging device 2, a focus control apparatus 3, and a body tracking apparatus (object tracking apparatus) 10.

The imaging device 2 images the moving image. The imaging device 2 includes an imaging element such as a CCD (Charge coupled device) and a CMOS (complementary metal oxide semiconductor) imaging element. According to one or more embodiments of the present invention, the imaging device 2 images a 30-frame image per second. The imaging device 2 outputs the imaged moving image as the image, in which plural frames are arrayed in time series, to the body tracking apparatus 10.

The body tracking apparatus 10 tracks the object that is of a tracked target from the time-series image and outputs the position of the object in the image to the focus control apparatus 3. The detailed configuration of the body tracking apparatus 10 is described later.

The focus control apparatus 3 adjusts a focal point of the imaging device 2 based on the position of the object in the image input from the body tracking apparatus 10.

The detailed configuration of the body tracking apparatus 10 will be described below. The body tracking apparatus 10 includes an image obtaining unit 11, a storage unit 12, an initialization unit 13, and a tracking unit 14. The initialization unit 13 specifies the object that becomes the tracked target in the image, and the tracking unit 14 tracks the object in the time-series image.

The image obtaining unit 11 sequentially obtains the time-series image (image data) from the imaging device 2 to store the time-series image in the storage unit 12.

Various pieces of information are stored in the storage unit 12, and the storage unit 12 includes a storage device such as an HDD (Hard Disk Drive) and a flash memory. The images of plural frames obtained by the image obtaining unit 11 are stored in the storage unit 12. Various pieces of information output from the initialization unit 13 and tracking unit 14 are stored in the storage unit 12.

<Configuration of Initialization Unit>

The initialization unit 13 includes an object designating unit 21, an initial object searching unit (object position specifying unit) 22, an initial object template producing unit (object feature quantity producing unit) 23, an initial surrounding region deciding unit 24, an initial surrounding searching unit (analog position specifying unit) 25, and an initial analog template producing unit (analog feature quantity producing unit) 26.

The object designating unit 21 specifies the object that becomes the tracked target in the image. For example, the object designating unit 21 receives input of information indicating where the object that becomes the tracked target exists in the image. For example, the digital video camera provides the image that is being imaged to a user by a display device provided with a touch panel, and the user designates a position in which the object that becomes the tracked target exists by using the touch panel. The object designating unit 21 outputs the information on the designated position to the initial object searching unit 22.

The object designating unit 21 may receive information indicating a region where the object exists.

Based on the position designated by the object designating unit 21, the initial object searching unit 22 searches the object from the image to specify the position in which the object exists (or the region where the object exists). Specifically, the initial object searching unit 22 obtains the image of the frame at a certain point (for example, the latest frame) from the storage unit 12. The following processing is performed to the image of the frame by the initialization unit 13. The initial object searching unit 22 performs face detection to a predetermined region including the designated position, for example, a 100-by-100-pixel region centering on the designated position. A well-known technology can be used as the face detection. The initial object searching unit 22 sets a rectangular region including the detected face to the object region where the object exists, and the initial object searching unit 22 sets a coordinate in the center of the object region to the position of the object. For example, the object region is set larger with enlarging image of the detected face. The initial object searching unit 22 outputs the pieces of information on the position of the object and (a width and a height of) the object region to the initial object template producing unit 23 and the initial surrounding region deciding unit 24. The initial object searching unit 22 stores the pieces of information on the position of the object and the object region in the storage unit 12 while correlating the pieces of information on the position of the object and the object region with the frame.

The initial object searching unit 22 may perform person detection instead of the face detection, or the initial object searching unit 22 may perform processing of extracting another feature point. The object region may be a region having another shape such as a circle or a region having a predetermined size.

The object designating unit 21 receives input of a specific condition, and the initial object searching unit 22 may detect the object based on the condition. For example, when the object designating unit 21 receives the input of the condition that "the face is set to the object", the initial object searching unit 22 performs the face detection over the whole image to set one of the detected faces to the object. When the object designating unit 21 receives the input of the condition that "a square body is set to the object", similarly the initial object searching unit 22 sets one of the square bodies detected from the image to the object.

The initial object template producing unit 23 extracts a feature quantity characterizing the object and produces a template characterizing the object. Specifically, the initial object template producing unit 23 produces the template from the image included in the object region. The template includes a characteristic feature quantity of the object, such as a color distribution and an edge distribution. The object in the image of the next frame can be tracked by performing tracking processing such as a gradient method using the template. A well-known technology can be used in the production of the template. The initial object template producing unit 23 stores the produced template of the object in the storage unit 12 while correlating the template with the frame.

The initial surrounding region deciding unit 24 decides on the region where the analog similar to the object is searched. Specifically, the initial surrounding region deciding unit 24 decides on a predetermined region around the object region as analog search region (surrounding region). The initial surrounding region deciding unit 24 outputs the information on the surrounding region to the initial surrounding searching unit 25.

The initial surrounding searching unit 25 searches the surrounding region to check whether an analog similar to the object exists around the object. For example, using the object template produced by the initial object template producing unit 23, the initial surrounding searching unit 25 searches the region similar to the template in the surrounding region to search the analog from the surrounding region. The initial surrounding searching unit 25 specifies the position of the detected analog and the region (analog region) where the analog exists, and the initial surrounding searching unit 25 stores the pieces of information on the position of the analog and the analog region in the storage unit 12 while correlating the pieces of information on the position of the analog and the analog region with the frame. When the plural analogs are detected in the surrounding region, the initial surrounding searching unit 25 stores the pieces of information on all the positions of the plural analogs and the analog regions in the storage unit 12. The initial surrounding searching unit 25 outputs the pieces of information on the position of the analog and the analog region to the initial analog template producing unit 26.

The initial surrounding searching unit 25 can detect the analog similar to the object (having the feature similar to that of the object) by using the method (method for detecting the similar feature) similar to the detection method (face detection) performed by the initial object searching unit 22. For example, the initial surrounding searching unit 25 may perform the face detection in the surrounding region to detect the image of the face, which differs from that of the object and exists in the surrounding region around the object.

The initial surrounding region deciding unit 24 decides that the whole image is the surrounding region where the analog is searched, and the initial surrounding searching unit 25 may search the analog except the object from the whole image.

The initial analog template producing unit 26 produces a template with respect to each detected analog. The method similar to that of the initial object template producing unit 23 can be adopted in the processing of producing the template. The initial analog template producing unit 26 stores the produced template of the analog in the storage unit 12 while correlating with the template with the frame.

Therefore, the initialization unit 13 stores the pieces of information on the position of the object, the object region, the template of the object, the position of the analog, the analog region, and the template of the analog in the image of a certain frame in the storage unit 12. The tracking unit 14 performs the tracking of the object from the next frame based on the pieces of information.

<Configuration of Tracking Unit>

Figure 2:
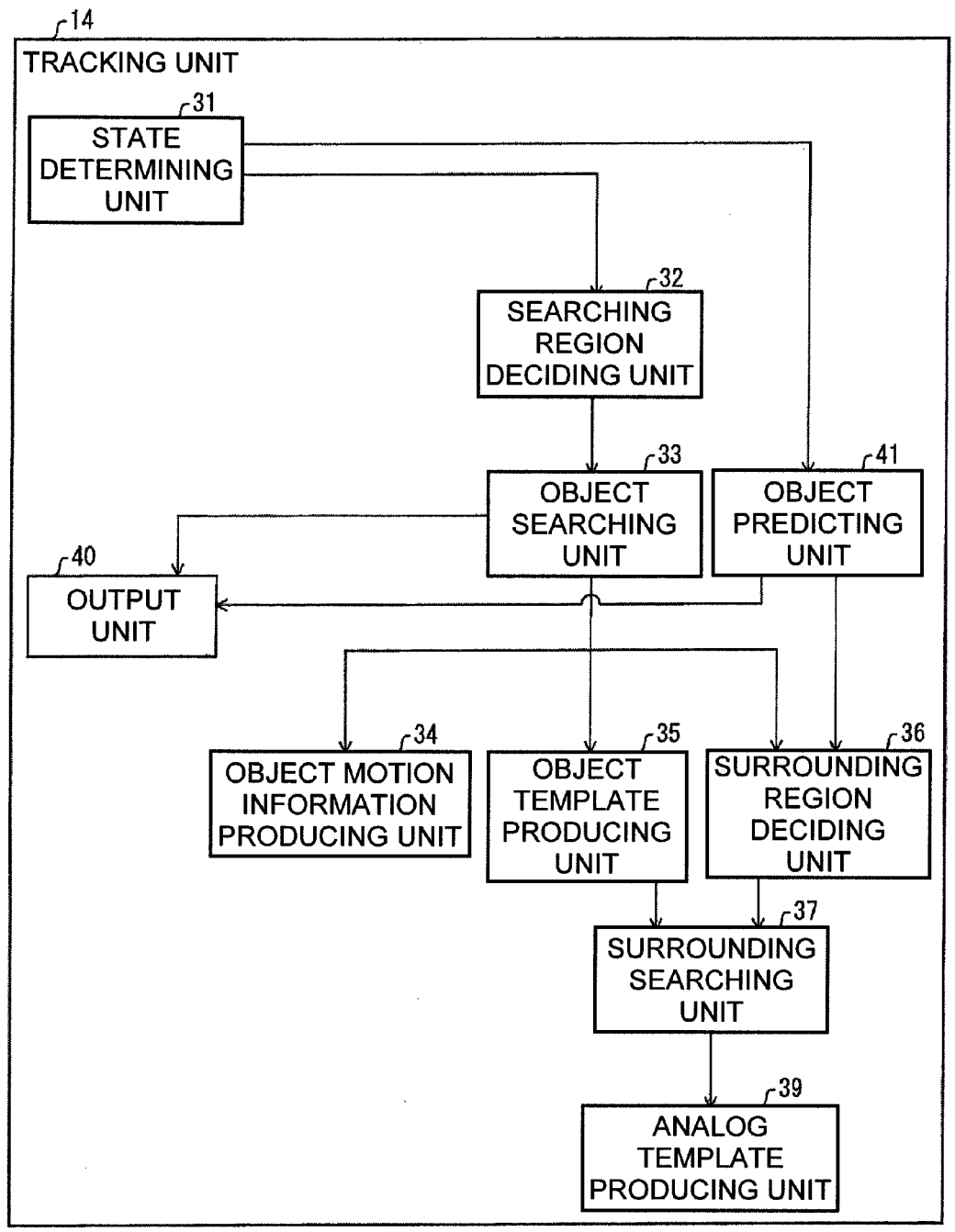
FIG. 2 is a block diagram illustrating a configuration of a tracking unit of the body tracking system according to one or more embodiments of the invention.

FIG. 2 is a block diagram illustrating a configuration of the tracking unit 14. The tracking unit 14 includes a state determining unit (positional relationship determining unit) 31, a searching region deciding unit 32, an object searching unit (object position specifying unit) 33, an object motion information producing unit (object motional state specifying unit) 34, an object template producing unit (object feature quantity producing unit) 35, a surrounding region deciding unit 36, a surrounding searching unit (analog position specifying unit) 37, an analog template producing unit (analog feature quantity producing unit) 39, an output unit 40, and an object predicting unit (object position specifying unit) 41.

The image obtaining unit 11 obtains an image of the next frame of the image, in which the object that becomes the tracked target is specified by the initialization unit 13, from the imaging device 2 to store the image of the next frame in the storage unit 12. The tracking unit 14 tracks the object in the image of the next frame. Hereinafter the frame of the processing target to which the tracking unit 14 performs the tracking processing is referred to as a current frame, and the image of the current frame is referred to as a processing target image.

The state determining unit 31 determines a positional relationship between the object and the analog existing around the object from the position of the object, the object region, the position of the analog, and the analog region in a previous frame of the current frame.

When the analog is not detected in the surrounding region of the object in the previous frame of the current frame, it is believed that a body in which "transfer of tracking" is easily generated does not exist near the object. In the "transfer of tracking", the analog is mistakenly tracked as the tracked target. Usually it is assumed that a moving amount of the body is not so large in the image of one frame or several frames. Therefore, when the analog is not detected in the surrounding region of the object in the previous frame of the current frame, the object can be tracked by performing normal tracking processing. When the analog is not detected in the surrounding region of the object in the previous frame of the current frame, the state determining unit 31 determines that a tracking state indicating the positional relationship between the object and the analog is "safety". The tracking state "safety" indicates a state in which a risk of generating the transfer of tracking is not generated (small chance of generation) even if the normal tracking processing is performed.

When the object and the analog are separated larger than a predetermined distance, a possibility of generating the transfer of tracking is low even if the normal tracking processing is performed. Therefore, when the object and the analog are separated larger than the predetermined distance, the state determining unit 31 determines that the tracking state indicating the positional relationship between the object and the analog is "safety".

When the object and the analog are brought close to each other within the predetermined distance (the analog exists within a predetermined range around the object), that is, when the object and the analog exists in close to each other, the state determining unit 31 determines that the tracking state indicating the positional relationship between the object and the analog is "proximity". The tracking state "proximity" indicates a state in which the analog that possibly generates the transfer of tracking through the tracking processing exists near the object although the normal tracking processing can be performed to track the object.

When the object and the analog overlap each other (the analog exists within the predetermined range near the object), the state determining unit 31 determines that the tracking state indicating the positional relationship between the object and the analog is "overlap". The tracking state "overlap" indicates a state in which the transfer of tracking from the object to the analog is possibly generated when the normal tracking processing is performed.

The state determining unit 31 may determine that the positional relationship between the object and the analog is "overlap" when the analog exists within a predetermined range (first range) near the object or when the analog exists in the object, the state determining unit 31 may determine that the positional relationship between the object and the analog is "proximity" when the analog exists within a predetermined range (second range) outside the first range, and the state determining unit 31 may determine that the positional relationship between the object and the analog is "safety" when the analog exists in neither first range nor the second range. For example, the determination of the positional relationship between the object and the analog may be made by a distance between the position in the center of the object region and the position in the center of the analog region, an interval (gap) between the object region and the analog region, or an overlapping area between the object region and the analog region. The detailed processing of determining the tracking state is described later.

When the tracking state is "safety" or "proximity", the state determining unit 31 outputs the information on the tracking state to the searching region deciding unit 32, and the tracking unit 14 performs the tracking processing to track the object and the analog in the current frame.

When the tracking state is "overlap", the state determining unit 31 outputs the information on the tracking state to the object predicting unit 41, the tracking unit 14 does not perform the normal tracking processing but predicts the position of the object in the current frame from the motion of the object in the past frame. The tracking unit 14 searches the analog that exists around the predicted position of the object, or the tracking unit 14 specifies the position of the analog by predicting the position of the analog in the current frame from the motion of the analog in the past frame.

When the tracking state is "safety" or "proximity", the searching region deciding unit 32 decides on the region where the object is searched in the processing target image. For example, the searching region deciding unit 32 decides on the rectangular region, which is vertically and horizontally double (the area is four times) the object region in the previous frame centering on the position of the object in the previous frame, as the object searching region. The searching region deciding unit 32 outputs the information on the object searching region to the object searching unit 33.

Using the template of the object in the previous frame, the object searching unit 33 specifies the object region where the object and the position of the object in the current frame with respect to the object searching region by the gradient method. When the tracking state is "safety" or "proximity", the object and the analog are separated from each other to some extent. Therefore, even if the analog exists in the object searching region, the object searching unit 33 computes a score (likelihood that the body is the object) according to a distance of the body (a candidate of the object) from the position of the object in the previous frame by the gradient method, and the object searching unit 33 can decide on the object according to the score to track the object. Alternatively, the object searching unit 33 computes a score (likelihood that the body is the analog) according to a distance of the candidate of the object from the position of the analog in the previous frame, and the object searching unit 33 may decide on the object according to the score relating to the object and the score relating to the analog. A well-known technology can be used in the computation of the score. The object searching unit 33 may specify the position of the object by using plural templates according to the score by searching the object in each of plural templates. For example, the plural templates means templates of the objects in the plural past frames stored in the storage unit 12. Other usual body tracking methods such as a particle filter can be adopted in the tracking processing of the object searching unit 33. According to one or more embodiments of the present invention, the object searching unit 33 specifies the rectangular region including the object as the object region. However, similarly to the initial object searching unit 22, the shape of the object region is not limited to the rectangle. The object searching unit 33 stores the pieces of information on the position of the object and the object region in the specified current frame in the storage unit 12 while correlating the pieces of information on the position of the object and the object region with the current frame. The object searching unit 33 outputs the pieces of information on the position of the object and the object region in the current frame to the object motion information producing unit 34, the object template producing unit 35, the surrounding region deciding unit 36, and the output unit 40.

The object motion information producing unit 34 specifies motion (motional state) of the object to produce the information on a motional state based on the position of the object, which is obtained from the processing target image of the current frame and the image in the frame before the current frame. Specifically, the object motion information producing unit 34 obtains an average speed in the images of the objects among the plural frames from the position of the object in the current frame and the positions of the objects in the plural frames before the current frame. The object motion information producing unit 34 stores the obtained average speed as the motional state of the object in the storage unit 12.

The object motion information producing unit 34 may obtain an amount indicating the speed of the object by another method or obtain the speed and average acceleration of the object in the motional state.

The object template producing unit 35 extracts the characteristic feature quantity of the object in the processing target image of the current frame to produce the characteristic template of the object. The object template producing unit 35 can produce the template in the manner similar to that of the initial object template producing unit 23. The object template producing unit 35 stores the produced template of the object in the storage unit 12 while correlating the template with the current frame, and the object template producing unit 35 outputs the produced template of the object to the surrounding searching unit 37.

The template of the object may be produced by mixing (for example, averaging) the feature quantity obtained from the processing target image and the feature quantity obtained from the image of the past frame.

The surrounding region deciding unit 36 decides on the region where the analog similar to the object is searched. Similarly to the initial surrounding region deciding unit 24, the surrounding region deciding unit 36 decides on a predetermined region around the object region in the current frame as the region (surrounding region) where the analog is searched. The surrounding region may overlap the object searching region or be separated into plural regions. The surrounding region deciding unit 36 outputs the pieces of information on the surrounding region, the position of the object, and the object region in the current frame to the surrounding searching unit 37.

The surrounding searching unit 37 checks whether the analog exists around the object by searching the surrounding region. When the tracking state is "proximity", the surrounding searching unit 37 performs the tracking processing such as the gradient method by using the template of the analog in the previous frame based on the position of the analog in the previous frame stored in the storage unit 12, thereby tracking the analog. When the surrounding searching unit 37 fails to track the analog (for example, when the analog moves out of the surrounding region), the surrounding searching unit 37 ends the tracking of the analog. The analog may be tracked by using the template of the object. When the tracking state is "proximity" or "safety" in order to check whether the new analog comes close to the object, the surrounding searching unit 37 detects the analog existing in the surrounding region by searching the surrounding region by using the template of the object. The surrounding searching unit 37 specifies the position of the detected (or tracked) analog and the region (analog region) where the analog exists, and the surrounding searching unit 37 stores the pieces of information on the position of the analog and the analog region in the storage unit 12 while correlating the pieces of information on the position of the analog and the analog region with the current frame. When the plural analogs are detected in the surrounding region, the surrounding searching unit 37 stores the pieces of information on the positions of all the analogs and the analog regions in the storage unit 12. The surrounding searching unit 37 outputs the pieces of information on the position of the analog and the analog region to the analog template producing unit 39.

The surrounding searching unit 37 may search the analog in the manner similar to that of the initial surrounding searching unit 25. The surrounding searching unit 37 may track and search the analog by using not the template of the analog but the template of the object. In such cases, the processing of the tracking unit 14 becomes faster because the necessity to produce the template of the analog (analog template producing unit 39) is eliminated.

The analog template producing unit 39 extracts the characteristic feature quantity of the analog in the processing target image of the current frame to produce the characteristic template of the analog. The analog template producing unit 39 may produce the template in the manner similar to that of the initial analog template producing unit 26. The analog template producing unit 39 stores the produced template of the analog in the storage unit 12 while correlating the template with the current frame.

The output unit 40 outputs the pieces of information on the position of the object and the object region in the current frame to the focus control apparatus 3.

When the tracking state is "overlap", the object predicting unit 41 estimates the position of the object and the object region in the current frame from the motional state of the object stored in the storage unit 12. For example, the object predicting unit 41 estimates the position of the object in the processing target image of the current frame from the position of the object in the previous frame and the object speed. The object predicting unit 41 predicts that the size of the object region remains the size of the object region in the previous frame. The object predicting unit 41 may predict the size of the object region in the current frame from a history of a change in size of the object region in the plural past frames. The object predicting unit 41 stores the pieces of information on the estimated position of the object and the object region in the storage unit 12 while correlating the pieces of information on the position of the object and the object region with the current frame. The object predicting unit 41 outputs the pieces of information on the estimated position of the object and the object region to the output unit 40 and the surrounding region deciding unit 36.

When the tracking state is "overlap", the surrounding region deciding unit 36 decides on the surrounding region according to the estimated position of the object and the object region, and the surrounding searching unit 37 search the analog in the surrounding region. The surrounding searching unit 37 stores the pieces of information on the position and analog region of the detected body (analog) in the storage unit 12 and outputs the pieces of information on the position and analog region to the analog template producing unit 39. At this point, there is a probability that the body detected within the predetermined range including the estimated position of the object is the object. However, the transfer of the tracked target to the analog can be prevented, because the object predicting unit 41 specifies the position of the object by predicting the motional state of the past object. The analog that newly comes close to the object while the tracking state is "overlap" can be detected to prevent the transfer of the tracked target to another analog.

When the tracking state is "overlap", the surrounding searching unit 37 may estimate the position of the analog and the analog region in the current frame from the motional state of the past analog. For example, similarly to the object predicting unit 41, the position of the analog in the processing target image of the current frame is predicted from the position of the analog in the previous frame and the analog speed. The surrounding searching unit 37 stores the pieces of information on the estimated position of the analog and the analog region in the storage unit 12 while correlating the pieces of information on the estimated position of the analog and the analog region with the current frame. At this point, the tracking unit 14 may include an analog motion information producing unit (analog motional state specifying unit) that produces information on the motional state of the analog. The analog motion information producing unit produces the information on the motion (motional state) of the analog in the manner similar to that of the object motion information producing unit 34 based on the positions of the analog obtained from the processing target image of the current frame and the image in the frame before the current frame. When the analog is not detected in the earlier frame, the analog motion information producing unit does not produce the information on the motional state of the analog. When the plural analogs are detected in the current frame and earlier frame, the analog motion information producing unit correlates the analog of the current frame and the analog of the earlier frame by the feature or position of each analog to obtain the motional state (such as speed and acceleration) of each analog. The analog motion information producing unit stores the motional state of the analog in the storage unit 12.

The output unit 40 outputs the pieces of information on the estimated position of the object and the object region in the current frame to the focus control apparatus 3.

In the following frames, the state determining unit 31 determines the tracking state based on the estimated position of the object and the estimated position of the analog. When the estimated position of the object and the estimated position of the analog are sufficiently separated from each other, the state determining unit 31 determines that the tracking state is "proximity" or "safety", and the tracking unit 14 resumes the tracking of the object.

According to one or more embodiments of the present invention, the determination of the tracking state is made from the positional relationship between the object and the analog, and the tracking processing is dynamically changed according to the tracking state. The object is tracked when the tracking state is "safety" or "proximity". When the tracking state is "overlap", the object is not tracked, but the position of the object is predicted from the motional state of the object in the past frame. Therefore, even if the analog exists near the object (for example, the analog partially overlaps the object), the transfer of the tracked target can be prevented to perform precisely the continuous tracking of the object. Even in the situation in which the continuous tracking of the object cannot conventionally be performed (for example, a situation in which a person who is the object and another person who is the analog intersect and pass each other in the image) the body tracking apparatus 10 according to one or more embodiments of the present invention can continuously track the object.

The tracking unit 14 may concurrently perform the processing (the pieces of processing of the searching region deciding unit 32, object searching unit 33, object motion information producing unit 34, and object template producing unit 35) relating to the object searching and the processing (the pieces of processing of the surrounding region deciding unit 36, surrounding searching unit 37, and analog template producing unit 39) relating to the analog searching. In such cases, the surrounding region deciding unit 36, the surrounding searching unit 37, and the analog template producing unit 39 can perform the pieces of processing based on the pieces of information (such as the position of the object, the object region, and the template of the object) on the object in the previous frame. This is because the pieces of information such as the position of the object are expected not to be largely changed between the frames.

<Tracking Processing Flow>

Figure 3A:
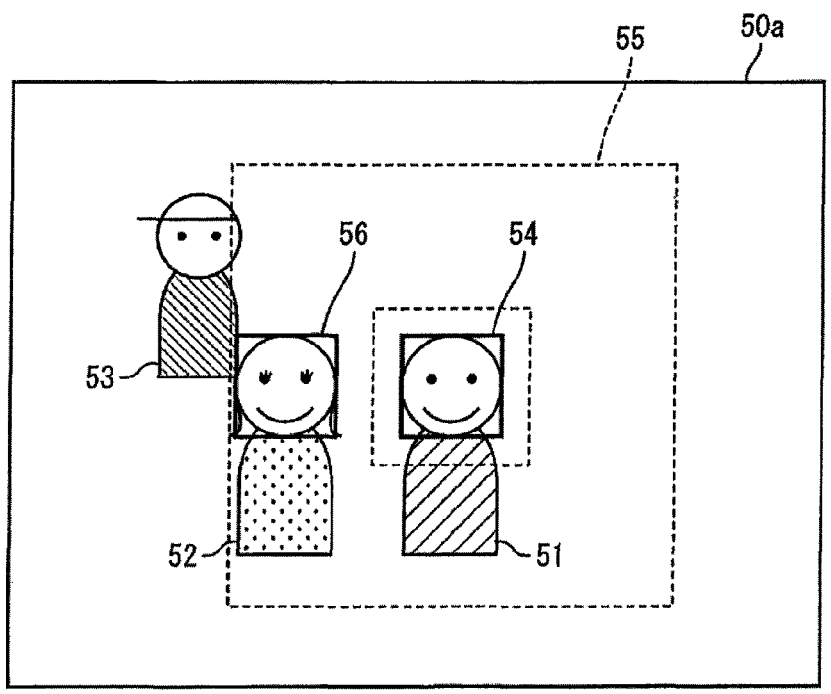
FIG. 3A is a view illustrating an example of tracking processing performed to an image of a certain frame.
Figure 3B:
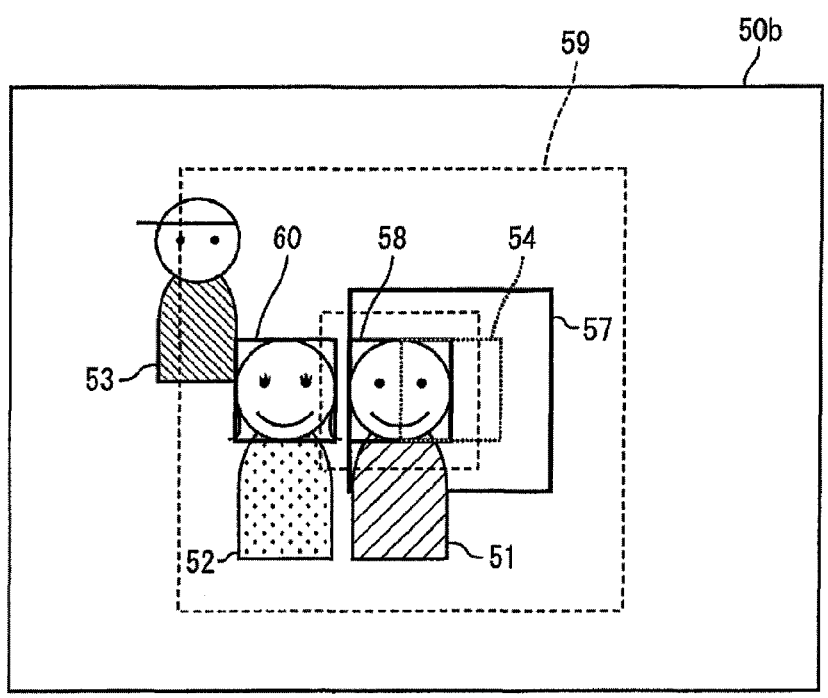
FIG. 3B is a view illustrating an example of the tracking processing performed to an image of the next frame.

An object tracking processing flow of the body tracking apparatus 10 will be described below. FIG. 3A is a view illustrating an example of the tracking processing performed to an image of a certain frame, and FIG. 3B is a view illustrating an example of the tracking processing performed to an image of the next frame. In an image 50a of a certain frame illustrated in FIG. 3A, a person 51 is imaged in the center of the image 50a, and a person 52 is imaged on the left of the person 51, and a person 53 is imaged at the upper left of the person 52. An example in which the person 51 is tracked will be described below.

Figure 4:
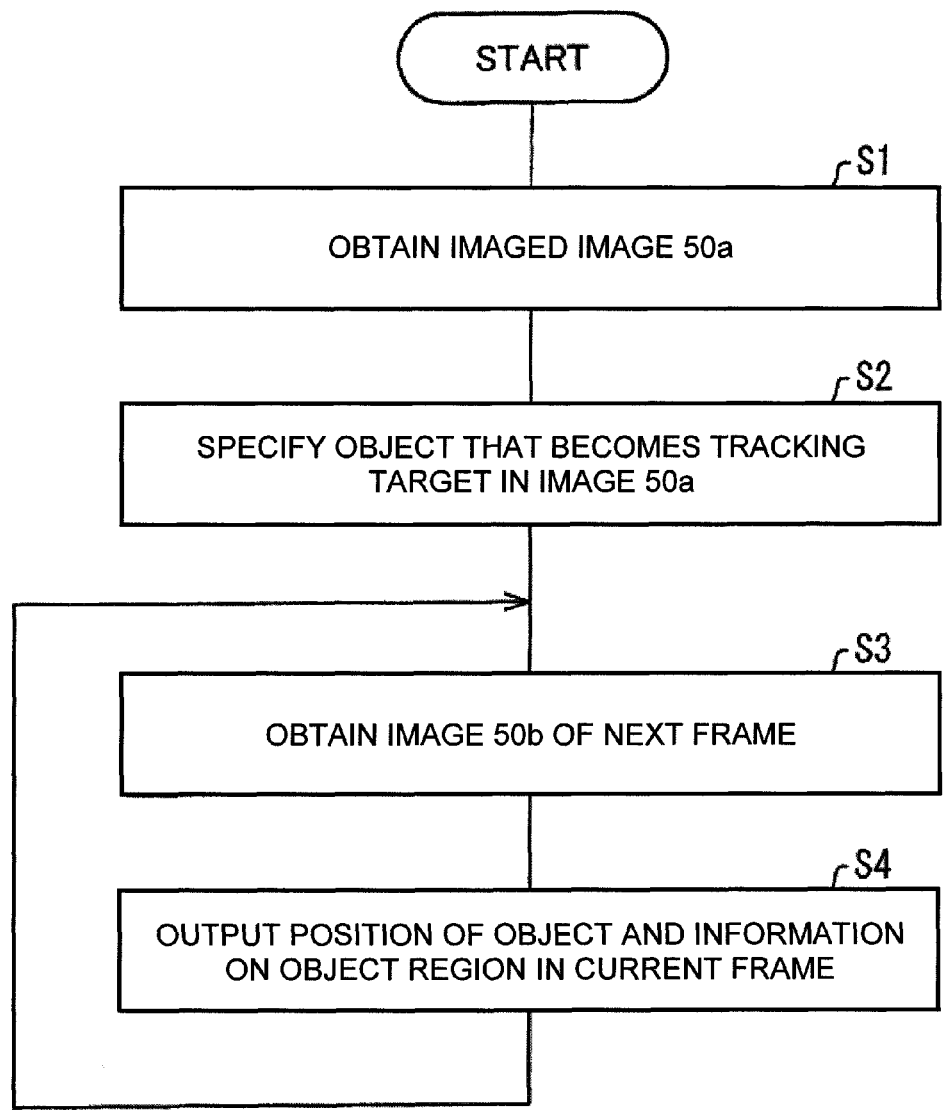
FIG. 4 is a flowchart illustrating an outline of an object tracking processing flow in a body tracking apparatus.

FIG. 4 is a flowchart illustrating an outline of an object tracking processing flow in the body tracking apparatus 10.

The image obtaining unit 11 obtains the imaged image 50a from the imaging device 2 (S1). The image obtaining unit 11 stores the obtained image 50a in the storage unit 12.

The initialization unit 13 obtains the image 50a of a certain frame from the storage unit 12 to specify the object that becomes the tracked target in the image 50a (S2).

The image obtaining unit 11 sets an image 50b of the next frame to the processing target image and obtain the image 50b from the imaging device 2 (S3). The image obtaining unit 11 stores the obtained image 50b in the storage unit 12.

The tracking unit 14 tracks the object in the image 50b of the current frame and outputs the pieces of information on the position of the object and the object region in the processing target image 50b of the current frame to the focus control apparatus 3 (S4).

Then the pieces of processing in S3 and S4 are repeated in each frame.

<Initialization Processing Flow>

Figure 5:
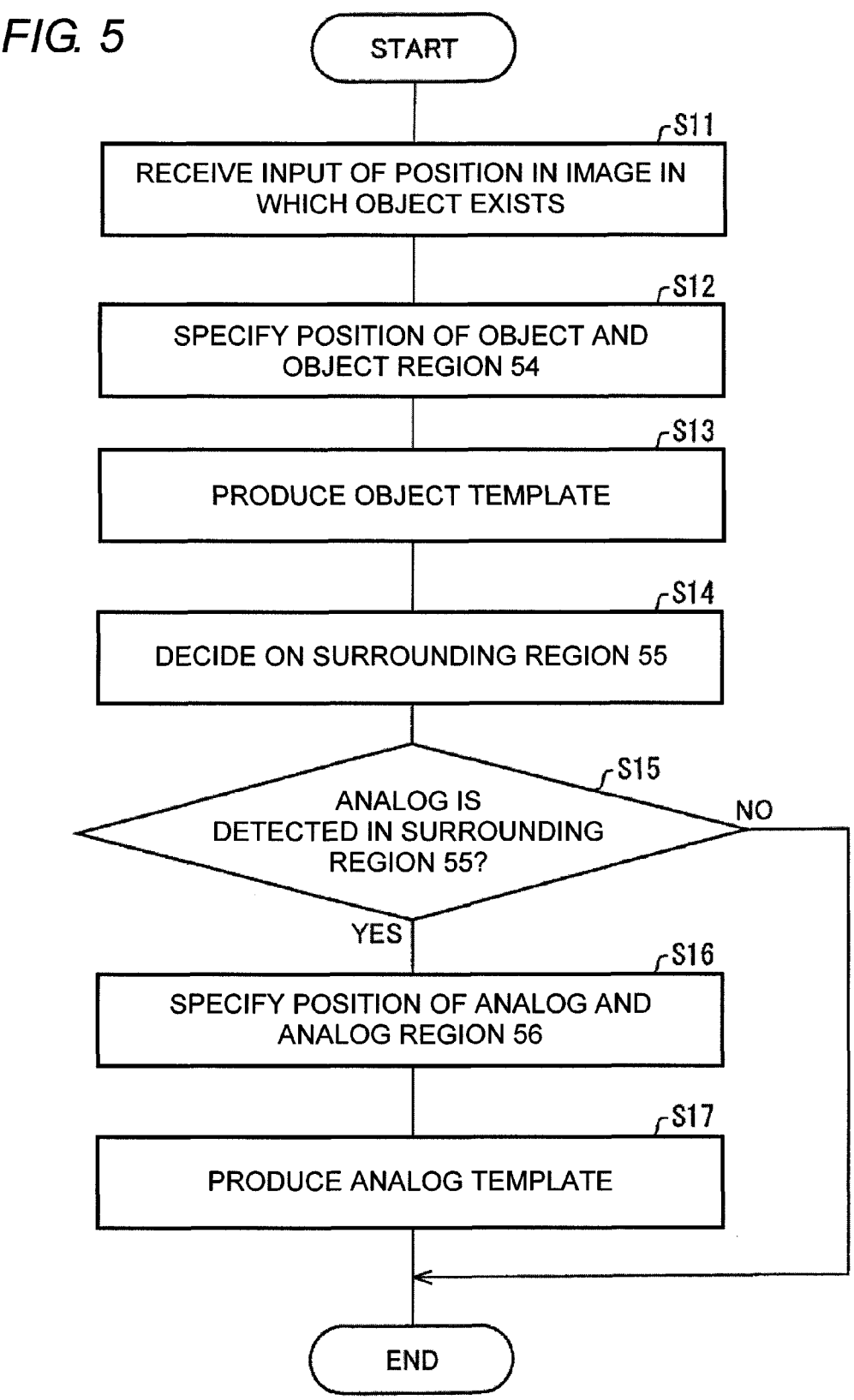
FIG. 5 is a flowchart illustrating an initialization processing flow in an initialization unit.

The detailed processing flow of the initialization unit 13 will be described below. FIG. 5 is a flowchart illustrating an initialization processing flow of the initialization unit 13.

The object designating unit 21 receives the position in the image in which the objects that becomes the tracked target exists from a user (S11). At this point, the user designates the position of the face of the person 51 with the touch panel.

The initial object searching unit 22 performs the face detection to a predetermined region including the designated position and specifies the position of the object (the face of the person 51) and an object region 54 (S12). The object region 54 is set as the rectangular region including the object. The position of the object is set to the center of the object region. The position of the object and the object region may be designated by upper-left and lower-right coordinates of the rectangular object region.

The initial object template producing unit 23 extracts the feature quantity, such as a color distribution of the image, which is included in the object region 54, and the initial object template producing unit 23 produces the characteristic object template of the object (S13).

The initial surrounding region deciding unit 24 decides on the predetermined region around the object region 54 as a region (surrounding region) 55 where the analog is searched (S14). The surrounding region 55 is a region surrounded by inner and outer broken lines around the object region 54. At this point, the surrounding region 55 and the object region 54 are separated from each other by a predetermined distance.

Using the object template, the initial surrounding searching unit 25 detects the analog (the face of the person 52) similar to the object with respect to the surrounding region 55. When the analog is not detected in the surrounding region 55 (NO in S15), the initialization unit 13 ends the processing. When the analog is detected in the surrounding region 55 (YES in S15), the initial surrounding searching unit 25 specifies the detected position of the analog and a region (analog region) 56 where the analog exists (S16). The analog region 56 is set as the rectangular region including the analog. The position of the analog is set to the center of the analog region.

After the processing in S16, the initial analog template producing unit 26 extracts the feature quantity such as the color distribution of the image included in the analog region 56 and produces the characteristic analog template of the analog (S17). Then the initialization unit 13 ends the initialization processing.

<Tracking Processing Flow>

Figure 6:
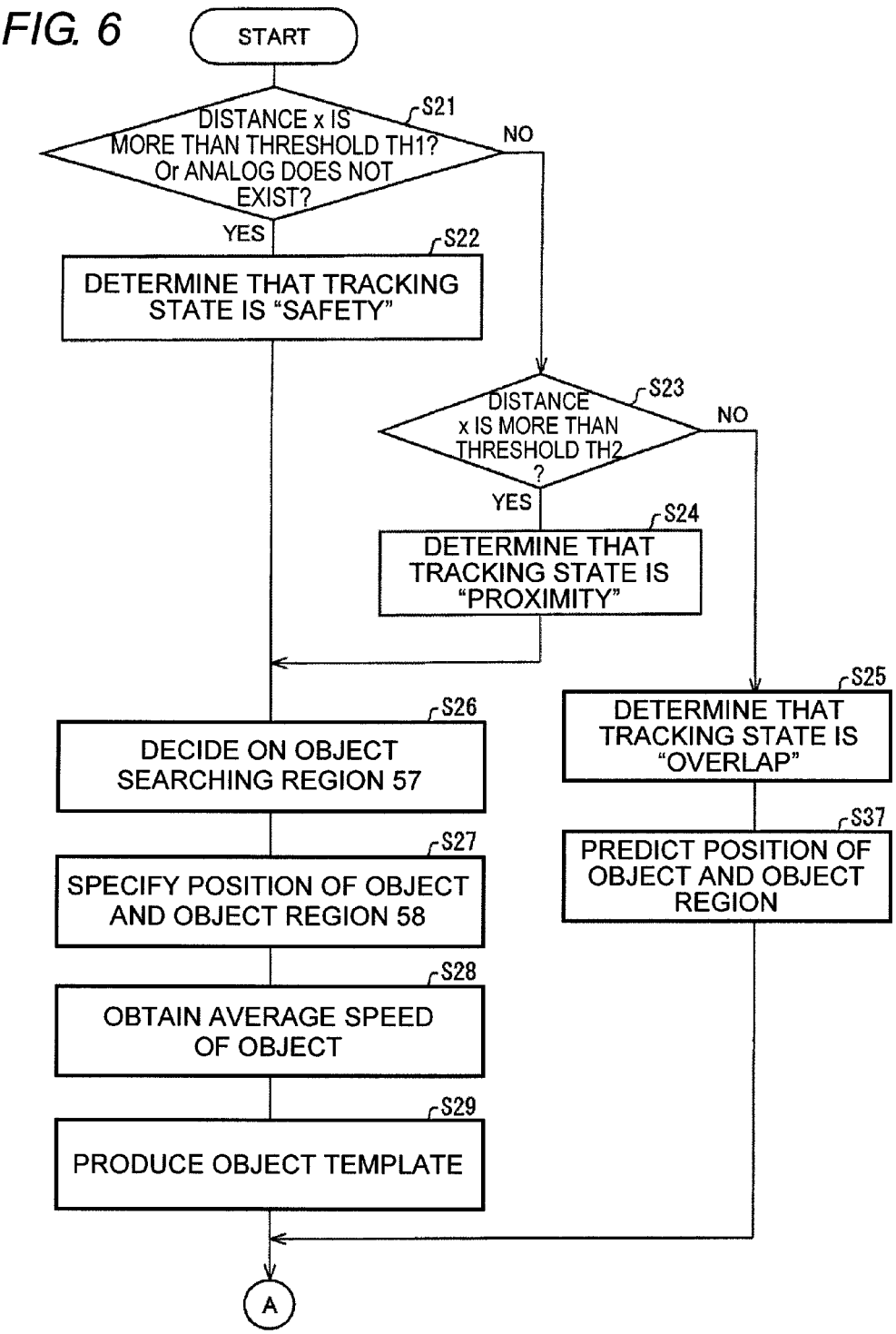
FIG. 6 is a flowchart illustrating a tracking processing flow in a tracking unit.
Figure 7:
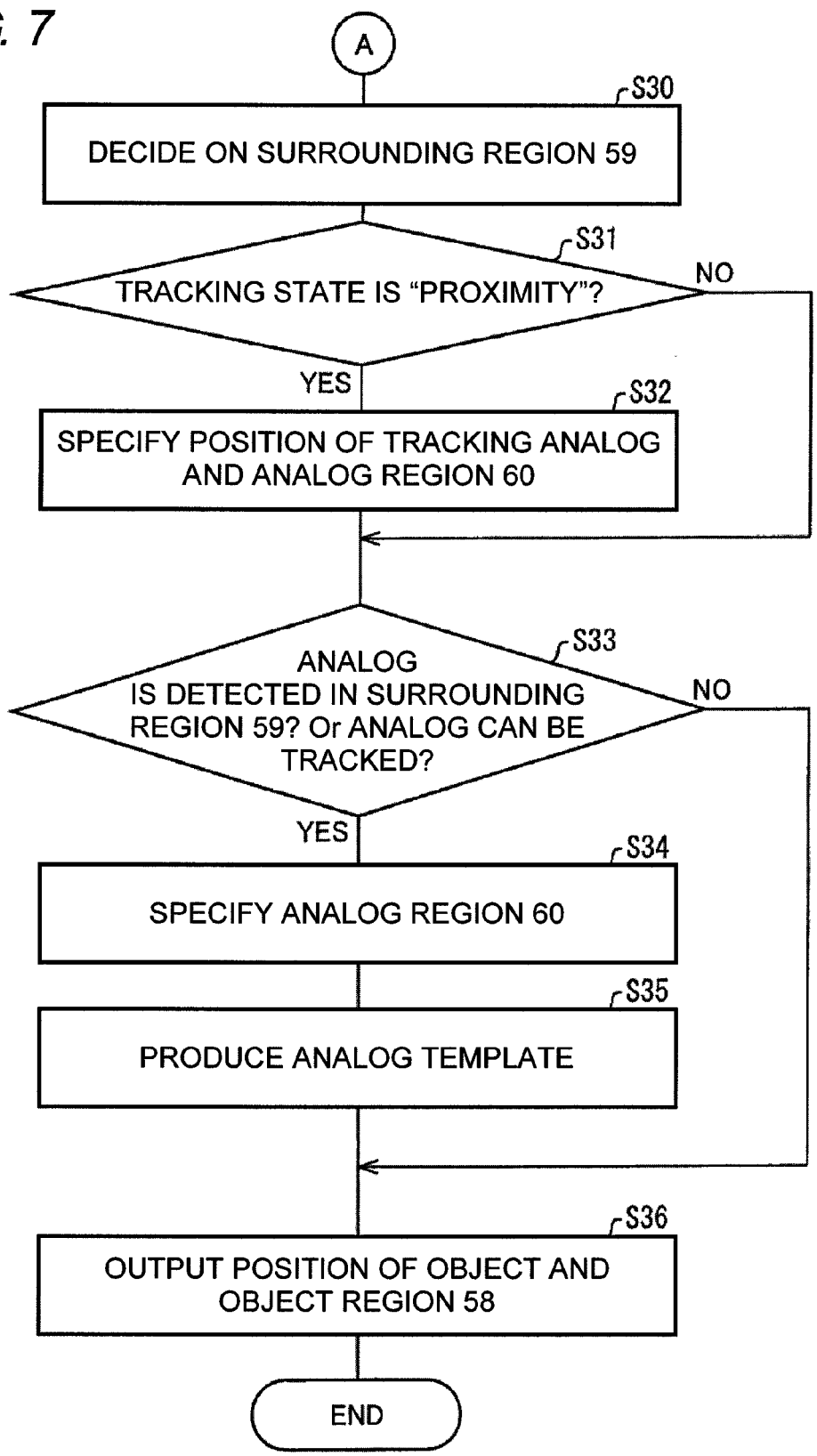
FIG. 7 is a flowchart illustrating the tracking processing flow in the tracking unit.

The detailed processing flow of the tracking unit 14 will be described below. FIGS. 6 and 7 are flowcharts illustrating a tracking processing flow in the tracking unit 14.

Figure 8A:
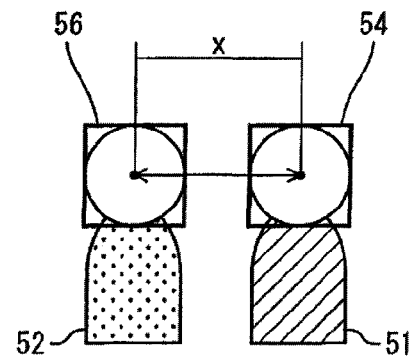
FIG. 8A illustrates an example of the positional relationship in which a tracking state is "safety"
Figure 8B:
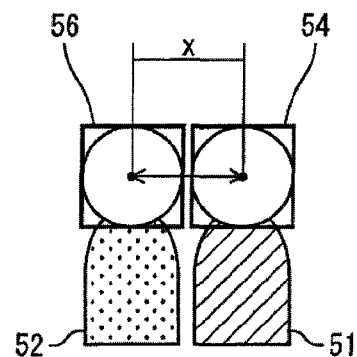
FIG. 8B illustrates an example of the positional relationship in which the tracking state is "proximity"
Figure 8C:
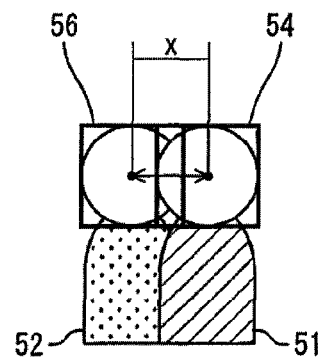
FIG. 8C illustrates an example of the positional relationship in which a tracking state is "overlap"

The state determining unit 31 determines the positional relationship between the object and the analog existing around the object in the image 50a of the previous frame of the current frame. FIGS. 8A to 8C are views illustrating an example of the positional relationship between the object and the analog. When the plural analogs are detected in the image 50a of the previous frame, the determination of the tracking state is made in each analog.

As illustrated in FIG. 8A, when a distance x between the position of the object and the position of the analog is more than a threshold TH1 or when the analog does not exist (YES in S21), the state determining unit 31 determines that the tracking state is "safety" (S22). However, for the plural analogs detected in the image 50a of the previous frame, the flow goes to S23 when the distance x between the position of the object and the position of the analog is not more than the threshold TH1 in at least one analog (NO in S21).

As illustrated in FIG. 8B, when the distance x between the position of the object and the position of the analog is not more than the threshold TH1 and when the distance x is more than a threshold TH2 (NO in S21 and YES in S23), the state determining unit 31 determines that the tracking state is "proximity" (S24). However, for the plural analogs detected in the image 50a of the previous frame, the flow goes to S25 when the distance x between the position of the object and the position of the analog is not more than the threshold TH2 in at least one analog (NO in S23).

As illustrated in FIG. 8C, when the distance x between the position of the object and the position of the analog is not more than the threshold TH2 (NO in S23), the state determining unit 31 determines that the tracking state is "overlap" (S25). At this point, the state determining unit 31 fixes the thresholds TH1 and TH2 according to the size of the object region and the size of each analog region. The thresholds TH1 and TH2 are increased with enlarging object region or analog region. For example, the threshold TH2 may be the sum of a half width of the object region and a half width of the analog region.

When the tracking state is determined to be "safety" (after S22), or when the tracking state is determined to be "proximity" (after S24), the searching region deciding unit 32 decides on the rectangular region, which is vertically and horizontally double (the area is four times) the object region in the previous frame centering on the position of the object in the previous frame, as an object searching region 57 (S26).

Using the template of the object in the previous frame, the object searching unit 33 specifies the position of the object and an object region 58 where the object exists in current frame with respect to the object searching region 57 through the tracking processing such as the gradient method (S27). The position of the object is set to the center of the object region 58.

The object motion information producing unit 34 obtains the average speed of the object in the image between the plural frames from position of the object in the current frame and the positions of the objects in the plural frames before the current frame (S28).

Similarly the processing in S13, the object template producing unit 35 extracts the feature quantity, such as the color distribution of the image, which is included in an object region 58 of the processing target image 50b of the current frame, and object template producing unit 35 produces the characteristic template of the object (S29).

When the tracking state is determined to be "overlap" (after S25), the object predicting unit 41 predicts the position of the object and the object region in the processing target image 50b of the current frame from the position of the object in the previous frame and the object speed (S37).

After the processing in S29 or S37, similarly to the processing in S14, the surrounding region deciding unit 36 decides on the predetermined region around the object region as a region (surrounding region) 59 where the analog is searched (S30).

After the processing in S30, when the tracking state is determined to be "proximity" (YES in S31), the surrounding searching unit 37 performs the tracking processing such as the gradient method by using the template of the analog in the previous frame based on the position of the analog in the previous frame, thereby tracking the analog (such as the face of the person 52). The tracked position of the analog and an analog region 60 are specified (S32).

When the tracking state is determined to be "safety" or "overlap" (NO in S31), or after the processing in S32, the surrounding searching unit 37 search the surrounding region 59 by using the template of the object to detect the analog (such as the face of the person 52) existing in the surrounding region.

When the face is not detected in the surrounding region 59 (and the analog cannot be tracked) (NO in S33), the output unit 40 outputs the pieces of information on the position of the object and the object region 58 in the processing target image 50b of the current frame to the focus control apparatus 3 (S36).

When the analog is detected in the surrounding region 59 or when the analog can be tracked (YES in S33), the surrounding searching unit 37 specifies the position of each detected and tracked analog and the region (analog region) 60 where each analog exists (S34). The analog region 60 is set as the rectangular region including the analog. The position of the analog is set to the center of the analog region.

The analog template producing unit 39 extracts the feature quantity, such as the color distribution of the image, which is included in the analog region 60 of the processing target image 50b of the current frame, and the analog template producing unit 39 produces the characteristic template of each analog (S35).

The output unit 40 outputs the pieces of information on the position of the object and the object region 58 in the processing target image 50b of the current frame to the focus control apparatus 3 (S36). Then the tracking unit 14 ends the tracking processing in the current frame.

In the decision in S26 of the object searching region 57, when the tracking state is determined to be "overlap" in the previous frame while the tracking state is determined to be "safety" or "proximity" in the current frame, a wider region may be decided on as the object searching region 57. For example, a rectangular region which is vertically and horizontally triple (the area is nine times) the object region 54 (FIG. 3B) in the previous frame may be decided on as the object searching region 57.

In the processing in S37, the object predicting unit 41 may predict the position of the object from the motion of the background image.

In the processing in S21, the tracking state is determined to be "safety" when the analog is not detected in the previous frame without providing the threshold TH1, and the tracking state is determined to be "proximity" or "overlap" when the analog is detected in the previous frame without providing the threshold TH1.

Figure 9:
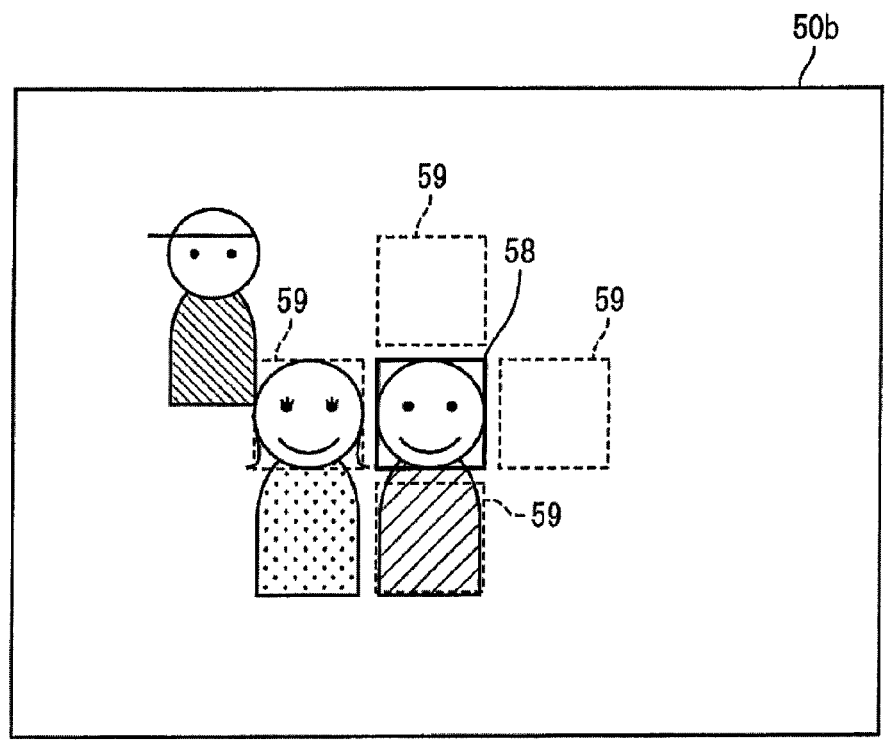
FIG. 9 is a view illustrating an example of a surrounding region.

In the processing in S30, the surrounding region deciding unit 36 may decide that the plural regions divided around the object region is the surrounding region. For example, as illustrated in FIG. 9, four rectangular surrounding regions 59 may be provided above and below and on the right and left of the object region 58. The object region 58 and the surrounding regions 59 may be in contact with each other.

According to one or more embodiments of the present invention, the face image of the person is detected and tracked from the shot moving image. However, the body tracking apparatus 10 according to one or more embodiments of the present invention can also applied to other moving images such as animation. An image of an upper body or whole body of a person may be detected, or images of other moving bodies such as a ball, a vehicle, and a carrying baggage may be detected. Even in the static body, the body moves in the shot image when the imaging device 2 is moved. Therefore, the body tracking apparatus 10 according to one or more embodiments of the present invention can also applied to the static body. That is, one or more embodiments of the invention can be applied to the tracking of the object that moves in the obtained time-series image.

Finally, each block of the body tracking apparatus 10, particularly the object designating unit 21, the initial object searching unit 22, the initial object template producing unit 23, the initial surrounding region deciding unit 24, the initial surrounding searching unit 25, the initial analog template producing unit 26, the state determining unit 31, the searching region deciding unit 32, the object searching unit 33, the object motion information producing unit 34, the object template producing unit 35, the surrounding region deciding unit 36, the surrounding searching unit 37, the analog template producing unit 39, the output unit 40, and the object predicting unit 41 may be formed by hardware logic or may be realized as follows by software using the CPU.

That is, the body tracking apparatus 10 includes the CPU (Central Processing Unit) that executes a command of a control program realizing each function, the ROM (Read Only Memory) in which the program is stored, the RAM (Random Access Memory) in which the program is developed, and the storage device (recording medium) such as a memory in which the program and various pieces of data are stored. Program codes (an executable format program, an intermediate code program, and a source program) of the control programs that are of the software realizing the functions in the body tracking apparatus 10 are recorded in the recording medium while the computer can be read the program codes, the recording medium is supplied to the image body tracking apparatus 10, and the computer (or the CPU or MPU (Microprocessor Unit)) reads and executes the program code recorded in the recording medium.

Examples of the recording medium include tape system such as magnetic tape and cassette tape, disk systems including magnetic disks such as floppy disk (registered trademark) and a hard disk and optical disks such as a CD-ROM (Compact Disc read Only Memory), an MO (Magneto-Optical) an MD (Mini Disc), a DVD (Digital Versatile Disc), and a CD-R (CD Recordable), card systems such as an IC card (including a memory card) and an optical card, and semiconductor memory systems such as a mask ROM, an EPROM (Erasable and Programmable Read Only Memory), an EEPROM (Electrically Erasable and Programmable Read Only Memory) and a flash ROM.

The image body tracking apparatus 10 is configured to be able to be connected to a communication network, and the program code may be supplied through the communication network. There is no particular limitation to the communication network. Examples of the communication network include the Internet, an intranet, an extranet, a LAN (Local Area Network), an ISDN (Integrated Services Digital Network), a VAN (Value-added Network), a CATV (Community Area Television) communication network, a virtual private network, a telephone line network, a mobile communication network, and a satellite communication network. There is no particular limitation to a transmission medium included in the communication network. Examples of the transmission medium include wired lines such as IEEE (Institute of Electrical and Electronic Engineers) 1394, a USB, a power-line carrier, a cable TV line, a telephone line, and an ADSL (Asynchronous Digital Subscriber Loop) line and wireless lines such as infrared ray such as IrDA (Infrared Data Association) and a remote controller, Bluetooth (registered trademark), 802.11 wireless, HDR (High Data Rate), a mobile telephone network, a satellite line, and a terrestrial digital network. One or more embodiments of the invention can be realized in the form of a computer data signal embedded in a carrier wave in which the program code is embodied by electronic transmission.

The invention is not limited to the specific embodiments above, and various changes can be made without departing from the scope of the invention.

For example, one or more embodiments of the invention can be applied to instruments, such as the digital camera, the digital video camera, and the camera-equipped mobile phone, which track the object in the moving image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An object tracking apparatus that tracks an object in a time-series image including a plurality of frames, the object tracking apparatus comprising:
   a positional relationship determining unit that determines a positional relationship between the object and an analog having a feature similar to that of the object in an earlier frame of a current frame;
   an object position specifying unit that specifies a position of the object in the current frame;
   an analog position specifying unit that specifies a position of the analog in the current frame when the analog exists in a surrounding region that is of a predetermined region around the object; and an object feature quantity producing unit that extracts characteristic information on the object from the image of the current frame, and produces a characteristic object feature quality of the object by using the extracted characteristic information on the object, wherein the object position specifying unit predicts the position of the object in the current frame to specify the position of the object based on the position of the object and a motional state of the object in an earlier frame when the positional relationship is in a first state, the object position specifying unit searches the object from an image of the current frame to specify the position of the object when the positional relationship is not in the first state, the object position specifying unit searches the object from the image of the current frame to specify the position of the object by using the object feature quantity in an earlier frame, and the analog position specifying unit searches the analog from the image of the current frame to specify the position of the analog in the current frame by using the object feature quantity.

2. The object tracking apparatus according to claim 1, wherein the positional relationship determining unit determines that the positional relationship is in the first state when the analog exists within a first range near the object.

3. The object tracking apparatus according to claim 1, wherein the analog position specifying unit searches the analog from the image of the current frame to specify the position of the analog.

4. The object tracking apparatus according to claim 2, further comprising an analog motional state specifying unit, wherein the positional relationship determining unit determines that the positional relationship is in a second state when the analog exists within a second range outside the first range, the analog motional state specifying unit specifies a motional state of the analog when the positional relationship is in the second state, the analog position specifying unit predicts the position of the analog in the current frame to specify the position of the analog based on the position of the analog and the motional state of the analog in an earlier frame when the positional relationship is in the first state, and the analog position specifying unit searches the analog from the image of the current frame to specify the position of the analog when the positional relationship is in the second state.

5. The object tracking apparatus according to claim 1, wherein the positional relationship determining unit determines that the positional relationship is in a third state when the analog exists in neither the first range nor the second range, and the analog position specifying unit searches the analog from the image of the current frame to specify the position of the analog when the positional relationship is in the third state.

6. The object tracking apparatus as in claim 1, further comprising an object motional state specifying unit that specifies the motional state of the object.

7. The object tracking apparatus as in claim 1, wherein the positional relationship determining unit determines the positional relationship according to a distance between the object and the analog.

8. The object tracking apparatus as in claim 1, wherein the motional state indicates a speed.

9. An object tracking apparatus that tracks an object in a time-series image including a plurality of frames, the object tracking apparatus comprising: an object position specifying unit that searches the object from an image of a current frame to specify a position of the object in the current frame; an analog position specifying unit searches an analog having a feature similar to that of the object from the image of the current frame, and specifies a position of the analog in the current frame when the analog exists in a surrounding region that is of a predetermined region around the object; and an object feature quantity producing unit that extracts characteristic information on the object from the image of the current frame, and produces a characteristic object feature quantity of the object by using the extracted characteristic information on the object, wherein the object position specifying unit searches the object from the image of the current frame to specify the position of the object by using the object feature quantity in an earlier frame, and the analog position specifying unit searches the analog from the image of the current frame to specify the position of the analog in the current frame by using the object feature quantity.

10. The object tracking apparatus according to claim 2, wherein the analog position specifying unit searches the analog from the image of the current frame to specify the position of the analog.

11. The object tracking apparatus as in claim 2, further comprising an object motional state specifying unit that specifies the motional state of the object.

12. The object tracking apparatus as in claim 3, further comprising an object motional state specifying unit that specifies the motional state of the object.

13. The object tracking apparatus as in claim 1, further comprising an object motional state specifying unit that specifies the motional state of the object.

14. The object tracking apparatus as in claim 5, further comprising an object motional state specifying unit that specifies the motional state of the object.

15. The object tracking apparatus as in claim 10, further comprising an object motional state specifying unit that specifies the motional state of the object.

16. An object tracking method for tracking an object in a time-series image including a plurality of frames, the object tracking method comprising the steps of: determining a positional relationship between the object and an analog having a feature similar to that of the object in an earlier frame of a current frame; specifying a position of the object in the current frame; specifying a position of the analog in the current frame when the analog exists in a surrounding region that is of a predetermined region around the object; and extracting characteristic information on the object from the image of the current frame, and producing a characteristic object feature quantity of the object by using the extracted characteristic information on the object; wherein, in the object position specifying step, the position of the object in the current frame is predicted to specify the position of the object based on the position of the object and a motional state of the object in an earlier frame when the positional relationship is in a first state, and the object from an image of the current frame is searched to specify the position of the object when the positional relationship is not in the first state, the object from the image of the current frame is searched to specify the position of the object by using the object feature quantity in an earlier frame, and in the analog position specifying step, the analog from the image of the current frame is searched to specify the position of the analog in the current frame by using the object feature quantity.

17. An object tracking method for tracking an object in a time-series image including a plurality of frames, the object tracking method comprising the steps of: searching the object from an image of a current frame to specify a position of the object in the current frame; searching an analog having a feature similar to that of the object from the image of the current frame, specifying a position of the analog in the current frame when the analog exists in a surrounding region that is of a predetermined region around the object; and extracting characteristic information on the object from the image of the current frame, and producing a characteristic object feature quantity of the object by using the extracted characteristic information on the object; wherein, in searching the object step, the object from the image of the current frame is searched to specify the position of the object by using the object feature quantity in an earlier frame, and in an analog position specifying step, the analog from the image of the current frame is searched to specify the position of the analog in the current frame by using the object feature quantity.

18. A control program stored on a non-transitory computer-readable medium that causes a computer to perform the steps of: determining a positional relationship between an object that is of a tracked target and an analog having a feature similar to that of the object in an earlier frame of a current frame in a time-series image including a plurality of frames; specifying a position of the object in the current frame; specifying a position of the analog in the current frame when the analog exists in a surrounding region that is of a predetermined region around the object; and extracting characteristic information on the object from the image of the current frame, and producing a characteristic object feature quantity of the object by using the extracted characteristic information on the object; wherein, in the object position specifying step, the position of the object in the current frame is predicted to specify the position of the object based on the position of the object and a motional state of the object in an earlier frame when the positional relationship is in a first state, the object from an image of the current frame is searched to specify the position of the object when the positional relationship is not in the first state, the object from the image of the current frame is searched to specify the position of the object by using the object feature quantity in an earlier frame, and in an analog position specifying step, the analog from the image of the current frame is searched to specify the position of the analog in the current frame by using the object feature quantity.

19. A control program stored on a non-transitory computer-readable medium that causes a computer to perform the steps of:
   searching an object that is of a tracked target from an image of a current frame in a time-series image including a plurality of frames to specify a position of the object in the current frame;
   searching an analog having a feature similar to that of the object from the image of the current frame, specifying a position of the analog in the current frame when the analog exists in a surrounding region that is of a predetermined region around the object; and
   extracting characteristic information on the object from the image of the current frame, and producing a characteristic object feature quantity of the object by using the extracted characteristic information on the object;
   wherein, in the searching the object step, the object from the image of the current frame is searched to specify the position of the object by using the object feature quantity in an earlier frame, and
   in an analog position specifying step, the analog from the image of the current frame is searched to specify the position of the analog in the current frame by using the object feature quantity.

* * * * *